United States Patent
Dempo

(10) Patent No.: US 7,068,635 B2
(45) Date of Patent: Jun. 27, 2006

(54) MOBILE NETWORK AND IP PACKET TRANSFERRING METHOD

(75) Inventor: Hiroshi Dempo, Tokyo (JP)

(73) Assignee: NEC Corporation, Tokyo (JP)

( * ) Notice: Subject to any disclaimer, the term of this patent is extended or adjusted under 35 U.S.C. 154(b) by 932 days.

(21) Appl. No.: 09/986,043

(22) Filed: Nov. 7, 2001

(65) Prior Publication Data

US 2002/0054584 A1    May 9, 2002

(30) Foreign Application Priority Data

Nov. 8, 2000    (JP) ............................. 2000-340624

(51) Int. Cl.
*H04Q 7/24* (2006.01)

(52) U.S. Cl. ...................................... 370/338; 370/349

(58) Field of Classification Search .................... None
See application file for complete search history.

(56) References Cited

U.S. PATENT DOCUMENTS

| | | | |
|---|---|---|---|
| 6,172,986 B1 | 1/2001 | Watanuki et al. | 370/466 |
| 6,195,705 B1 * | 2/2001 | Leung | 709/245 |
| 6,473,411 B1 * | 10/2002 | Kumaki et al. | 370/331 |
| 6,587,882 B1 * | 7/2003 | Inoue et al. | 709/227 |
| 6,636,498 B1 * | 10/2003 | Leung | 370/338 |
| 6,654,359 B1 * | 11/2003 | La Porta et al. | 370/328 |
| 6,763,007 B1 * | 7/2004 | La Porta et al. | 370/331 |
| 6,765,892 B1 * | 7/2004 | Leung et al. | 370/332 |

FOREIGN PATENT DOCUMENTS

| | | |
|---|---|---|
| EP | 1 032 179 A1 | 2/1999 |
| EP | 1 047 244 A1 | 4/1999 |
| JP | 7-129488 | 5/1995 |
| JP | 9-326805 | 12/1997 |
| JP | 10-31336 | 11/1998 |
| JP | 11-68842 | 3/1999 |
| JP | 2960349 | 7/1999 |

OTHER PUBLICATIONS

J. Chan et al., "The Challenges of Provisioning Real-Time Services in Wireless Internet," Telecommunications Journal of Australia, vol. 50, No. 3, 2000, (XP-002265176), pp. 37-48.

S.S. Chugh, "Supporting Quality of Service in Mobile Networks," Virginia Tech ECPE 6504: Wireless Networks and Mobile Computing, Spring 2000, XP-00265177, pp. 1-16.

M Liljebladh et al., "Integration Problems between IP Multicast and DiffServ Concepts in Mobile Networks," Ericsson Mobile Data Design, Master Thesis in Computing and Digital Tele. Sys. & Technology, (XP-002265175), pp. 1-59.

* cited by examiner

*Primary Examiner*—Bob A. Phunkulh
(74) *Attorney, Agent, or Firm*—Foley & Lardner LLP

(57) ABSTRACT

In a mobile network of the present invention, a mobile terminal handed over from one network to another network reports its destination and QoS (Quality of Service) information to an IP (Internet Protocol) node to which the mobile terminal is usually connected. The IP node transfers encapsulated IP packets or IP packets with an updated IP address to the destination of the mobile network via a path matching with a QoS class. The mobile network therefore implements end-to-end data communication with guaranteed QoS.

51 Claims, 7 Drawing Sheets

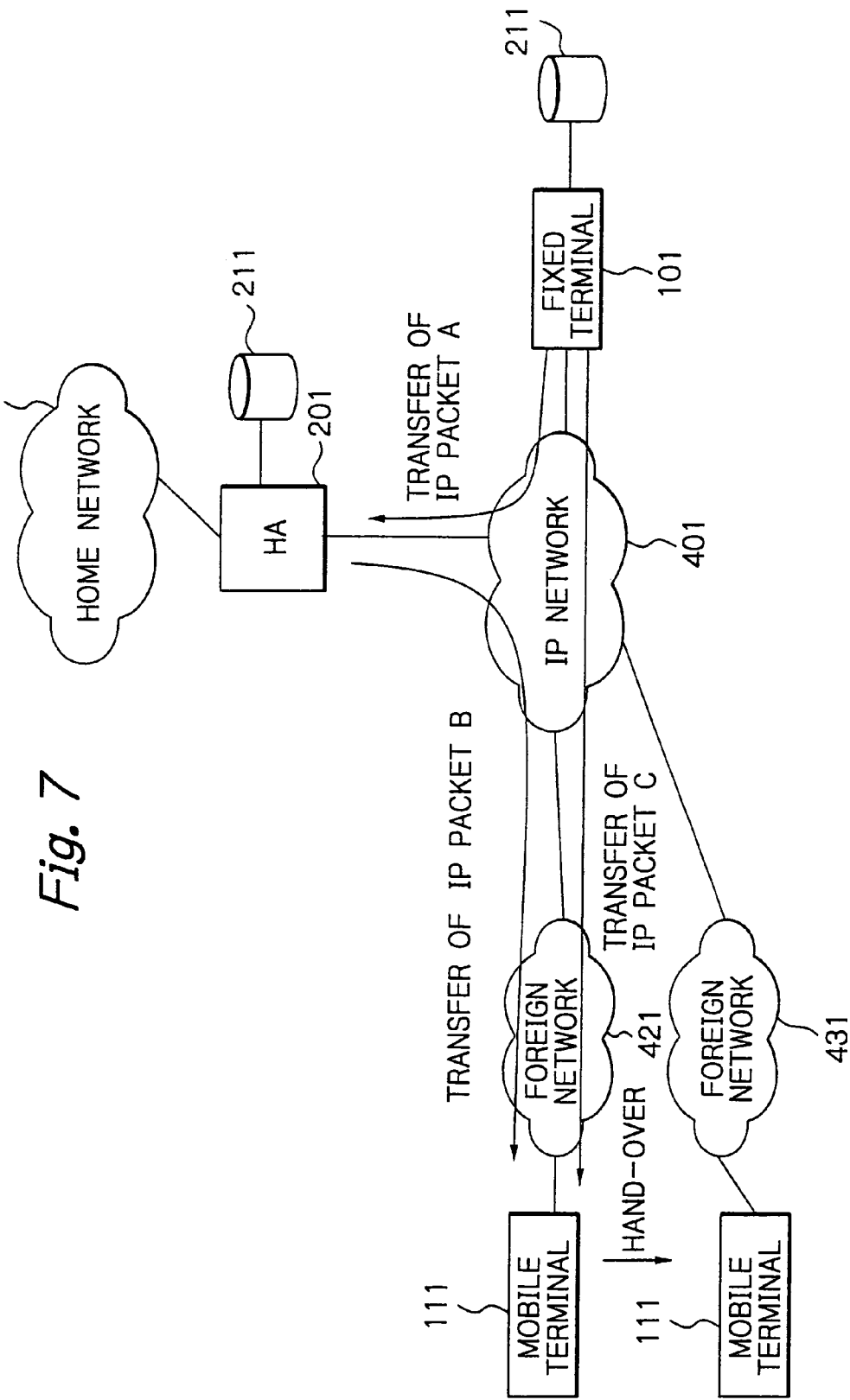

MOBILE NETWORK AND IP PACKET TRANSFERRING METHOD

BACKGROUND OF THE INVENTION

1. Field of the Invention

The present invention relates to a mobile network for allowing a mobile terminal to communicate with another terminal via a destination network and an IP (Internet Protocol) packet transferring method.

2. Description of the Background Art

IP packet communication is extensively used for data communication using personal computers and other data processing units. For IP packet communication, a particular IP address is assigned to each terminal in accordance with a network to which the terminal is usually connected. Therefore, to allow a mobile terminal handed over to another network to hold communication via the network, it is necessary to reassign an IP address particular to the new network to the mobile terminal. However, the other terminals cannot identify the mobile terminal handed over and provided with the new IP address.

Some different schemes have heretofore been proposed to implement data communication on a mobile terminal without changing an IP address when the terminal is handed over to a different network. IETF (Internet Engineering Task Force), for example, has recommended in RFC (Request for Comments) 2002 a mobile IP technology for encapsulating IP packets and transferring the encapsulated IP packets to a destination, i.e., transferring a given IP packet by using another IP packet. For encapsulation, there are available IP in IP Encapsulation recommended in IETF RFC 2003, Minimal Encapsulation within IP recommended in RFC 2004, and Generic Routing Encapsulation recommended in RFC 1701. The IP in IP Encapsulation scheme transfers a given IP packet by inserting it in another IP packet.

A conventional mobile network includes a fixed terminal, a notebook size, personal computer, handy phone or similar mobile terminal, a home agent for managing an IP address assigned to the mobile terminal, and foreign agents each for managing communication held on the mobile terminal at a particular destination. The fixed terminal is a personal computer or similar data processing unit situated at a fixed station. The home agent stores a binding table listing information for the transfer of encapsulated IP packets to the foreign agents.

The conventional mobile network has some problems left unsolved, as follows. Assume that a fixed terminal sends a plurality of packets of different degrees of priority to a mobile terminal connected to any one of the foreign agents. Then, the home agent encapsulates an IP packet with a low degree of priority and an IP packet with a high degree of priority by the same processing and then sends them to the foreign agent in the same QoS (Quality of Service) class. This is because QoS information is not registered at the binding table of the home agent.

Further, the binding table lists only a single destination for each home address or IP address assigned to the mobile terminal, limiting the transfer of encapsulated IP packets to a single destination. Consequently, when the foreign network is a mobile communication network, the mobile terminal cannot receive IP packets from a plurality of foreign agents at the same time. This makes, e.g., soft hand-over impracticable.

Technologies relating to the present invention are disclosed in, e.g., Japanese Patent Laid-Open Publication Nos. 7-129488, 9-326805, 10-313336 and 11-68842 and Japanese Patent 2,960,349.

SUMMARY OF THE INVENTION

It is an object of the present invention to provide a mobile network capable of implementing end-to-end data communication with guaranteed QoS even when a terminal is handed over to a foreign network and allowing the terminal to receive IP packets from a plurality of IP nodes at the same time, and an IP packet transferring method.

A mobile network for communication between a plurality of terminals of the present invention includes a first IP node for generating, on receiving an IP packet meant for a mobile terminal usually connected to the first IP node, but handed over, an encapsulated IP packet for transferring the IP packet to the destination of the mobile terminal, and transferring the encapsulated IP packet to the destination via a path matching with the QoS class of the encapsulated IP packet. A second IP node separates, when the mobile terminal is connected to the second IP node at the destination, the IP packet from the encapsulated IP packet received from the first IP node and sends the IP packet to the mobile terminal. The mobile terminal handed over reports its destination to the first IP node together with QoS information for setting the QoS class of the encapsulated IP packet.

BRIEF DESCRIPTION OF THE DRAWINGS

The above and other objects, features and advantages of the present invention will become more apparent from the following detailed description taken with the accompanying drawings in which:

FIG. 7 is a schematic block diagram showing an alternative embodiment of the present invention.

DESCRIPTION OF THE PREFERRED EMBODIMENTS

Figure 1:
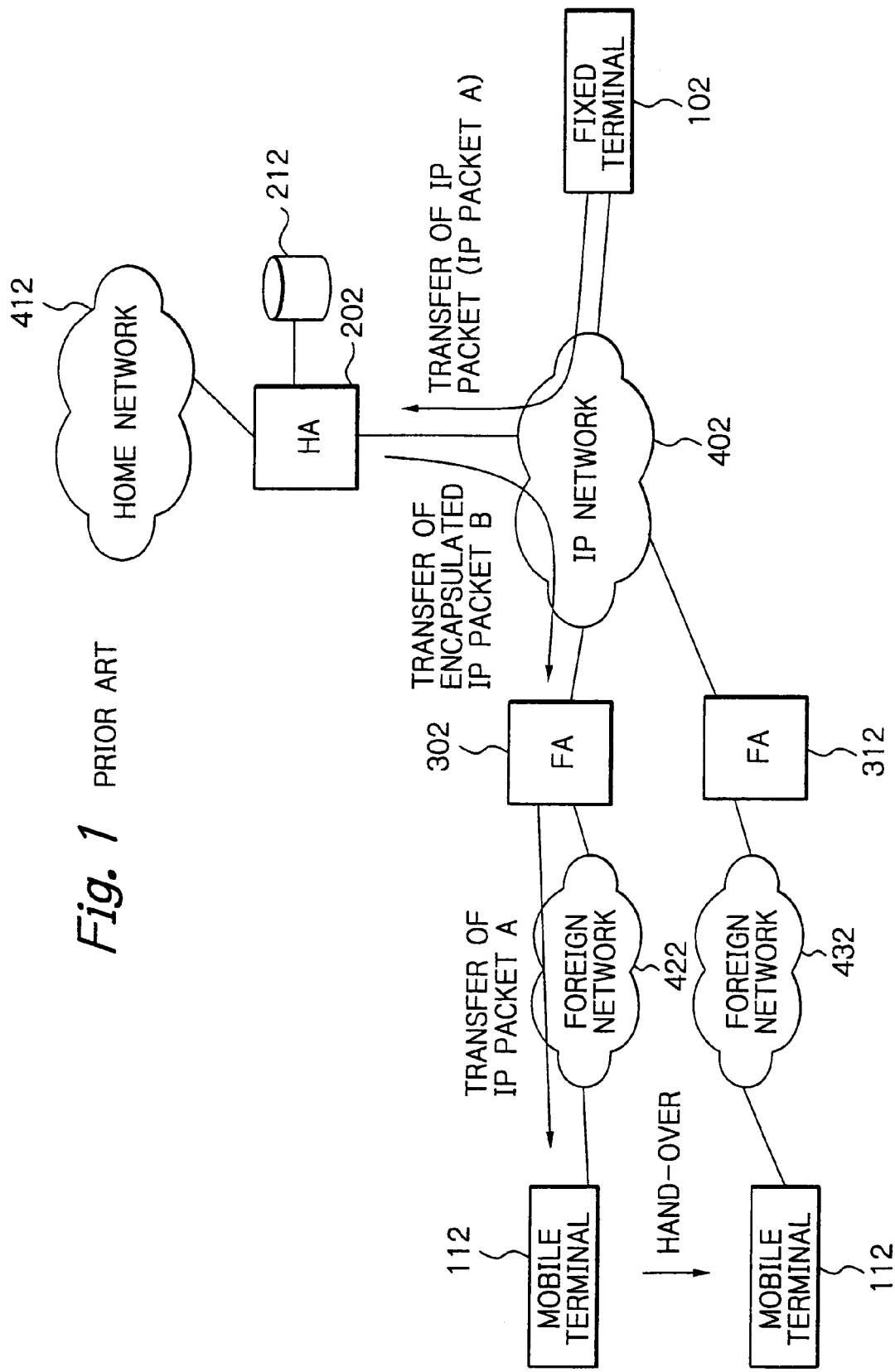
FIG. 1 is a schematic block diagram showing a mobile network using a conventional mobile IP technology.

To better understand the present invention, brief reference will be made to a conventional mobile network using a mobile IP technology, shown in FIG. 1. As shown, the mobile network includes a fixed terminal 102 and a notebook size, personal computer, handy phone or similar mobile terminal 112. An HA (Home Agent) 202 manages an IP address assigned to the mobile terminal 112. FAs (Foreign Agents) 302 and 312 each manage communication held on the mobile terminal 112 at a destination. The HA 202 and FAs 302 and 312 are usually referred to as IP nodes. The fixed terminal 102 is a personal computer or similar data processing unit situated at a fixed station. The HA 202 and FAs 302 and 312 are servers or similar data processing units.

The mobile terminal 112 is usually connected to a home network 412, which may be Ethernet, a radio LAN (Local Area Network) or a mobile communication network by way of example. The mobile terminal 112 is capable of accessing an IP network 402 via the home network 412. When the mobile terminal 112 is moved to a destination, it is connected to a foreign network 422 or 432, which may also be Ethernet, a radio LAN or a mobile communication network. The foreign networks 422 and 432 constitute networks for accessing the IP network 402.

When the fixed terminal 102 sends an IP packet A meant for the mobile terminal 112, the HA 202 encapsulates the IP packet A to thereby produce an encapsulated IP packet B. The encapsulated IP packet B is transferred from the HA 202 to, e.g., the FA 302 to which the mobile terminal 112 is currently connected via the IP network 402. The FA 302 separates the IP packet A from the encapsulated IP packet B and sends the IP packet A to the mobile terminal 112.

Figure 2:
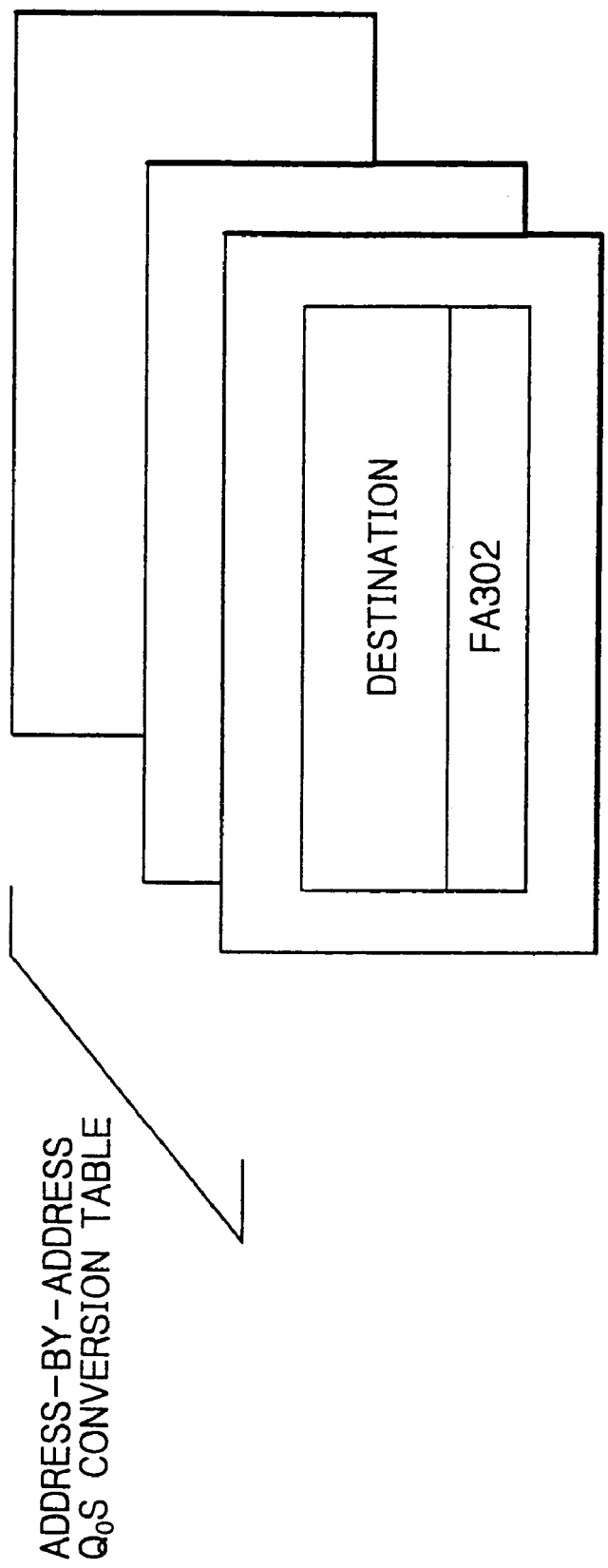
FIG. 2 shows a binding table stored in a home agent included in the network of FIG. 1.

The HA 202 stores a binding table 212 listing information for the transfer of the encapsulated IP packet B to the FA 302 or 312. As shown in FIG. 2, the binding table 212 has a plurality of pages each listing various kinds of information including an IP address or Care-of address and the term of validity of the page itself. Usually, information listed on the binding table 202 is valid only for a preselected term. The mobile terminal 112 immediately sends information for updating the binding table 202 to the HA 202 when handed over from, e.g., the FA 302 to the FA 312. Even when such hand-over does not occur, the mobile terminal 112 periodically sends the above information to the HA 202.

The conventional mobile network described above has some problems left unsolved, as discussed earlier.

Figure 3:
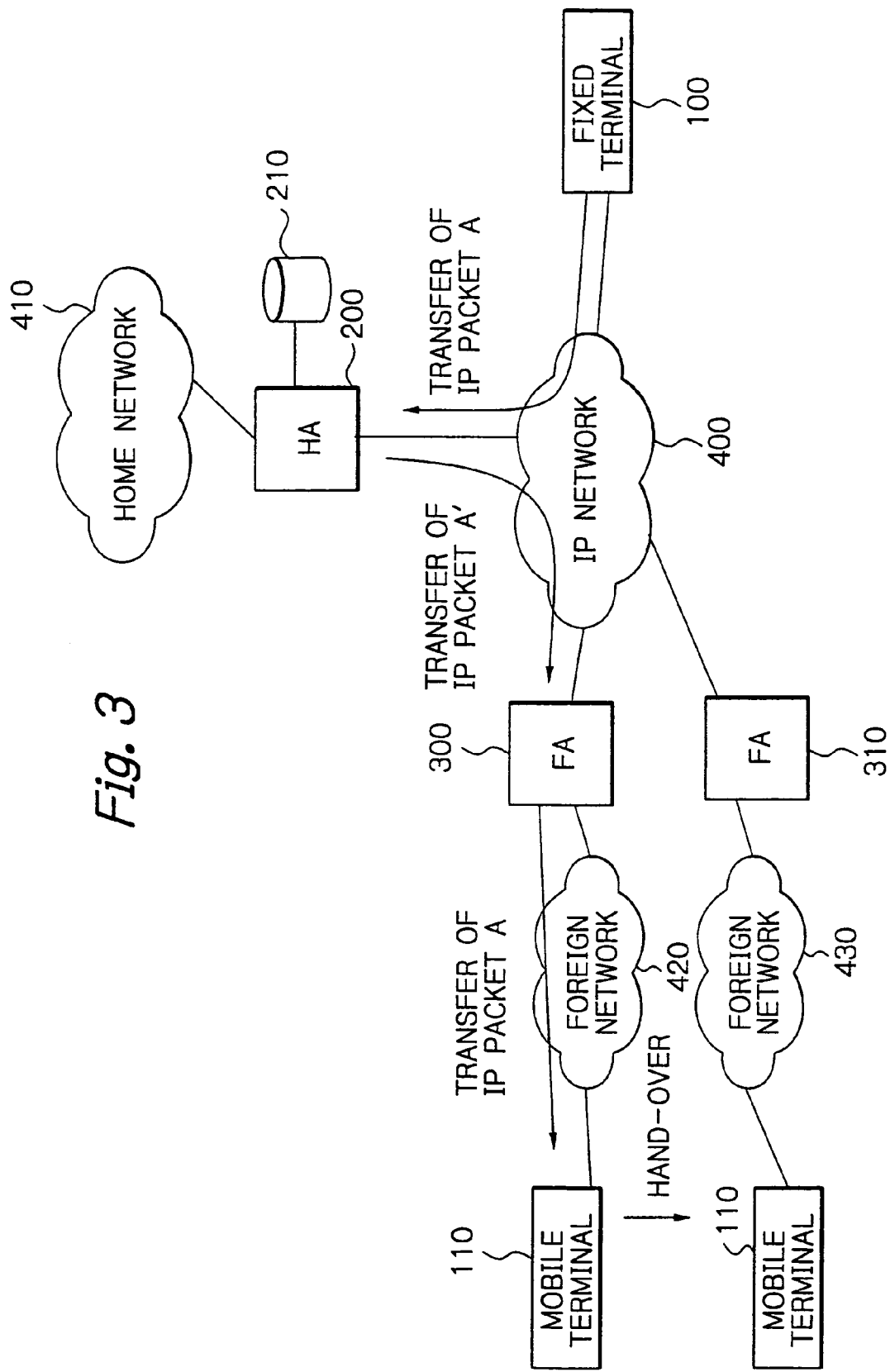
FIG. 3 is a schematic block diagram showing a mobile network embodying the present invention.

Referring to FIG. 3, a mobile network embodying the present invention is shown and includes a fixed terminal 100 and a mobile terminal 110. Again, the fixed terminal 100 is a personal computer or similar fixed, data processing unit while the mobile terminal 110 is a notebook size, personal computer, handy phone or similar mobile data processing unit. An HA 200 receives an IP packet meant for the mobile terminal 110 from the fixed terminal 100, encapsulates the IP packet, and sends the encapsulated packet to the mobile terminal 110. FAs 300 and 310 each separate the IP packet meant for the mobile terminal 110 from the encapsulated IP packet. The HA 200 and FAs 300 and 310 constitute IP nodes. The HA 200 and FAs 300 and 310 are servers or similar data processing units.

The fixed terminal 100, HA 200 and FAs 300 and 310 each include a processing device for executing various kinds of processing to be described later and a particular storage for storing preselected information, although not shown specifically.

The mobile terminal 110 is usually connected to a home network 410, which may be Ethernet, a radio LAN or a mobile communication network by way of example. The mobile terminal 110 is capable of accessing an IP network 400 via the home network 410. When the mobile terminal 110 is moved to a destination, it is connected to a foreign network 420 or 430, which may also be Ethernet, a radio LAN or a mobile communication network. The foreign networks 422 and 432 constitute networks for accessing the IP network 402.

The HA 200 assigns a particular IP address or home address to each of the fixed terminal 100 and mobile terminal 110, so that the terminals 100 and 110 can be unconditionally identified on the IP network 400. Also, a particular IP address or Care-of address is assigned to each of the FAs 300 and 310, so that the FAs 300 and 310 can be unconditionally identified on the IP network 400. When the mobile terminal 110 is connected to, e.g., the FA 300, at least one FA 300 reports its Care-of address to the mobile terminal 110. The Care-of address is written to a source address field or a destination address field included in the header of an IP packet. In the case of a Mobile IPv4 protocol, an IP packet may have a format described in IETF RFC 791.

When the mobile terminal 110 is handed over from one of the foreign networks 420 and 430 to the other foreign network, the FA 300 or 310 connected to the destination foreign network reports its Care-of address to the mobile terminal 110. The mobile terminal 110 sends the received Care-of address to the HA 200. The HA 200 manages the home address and Care-of address mobile terminal by mobile terminal and writes such information in a binding table 210, which is stored in the storage.

Figure 4:
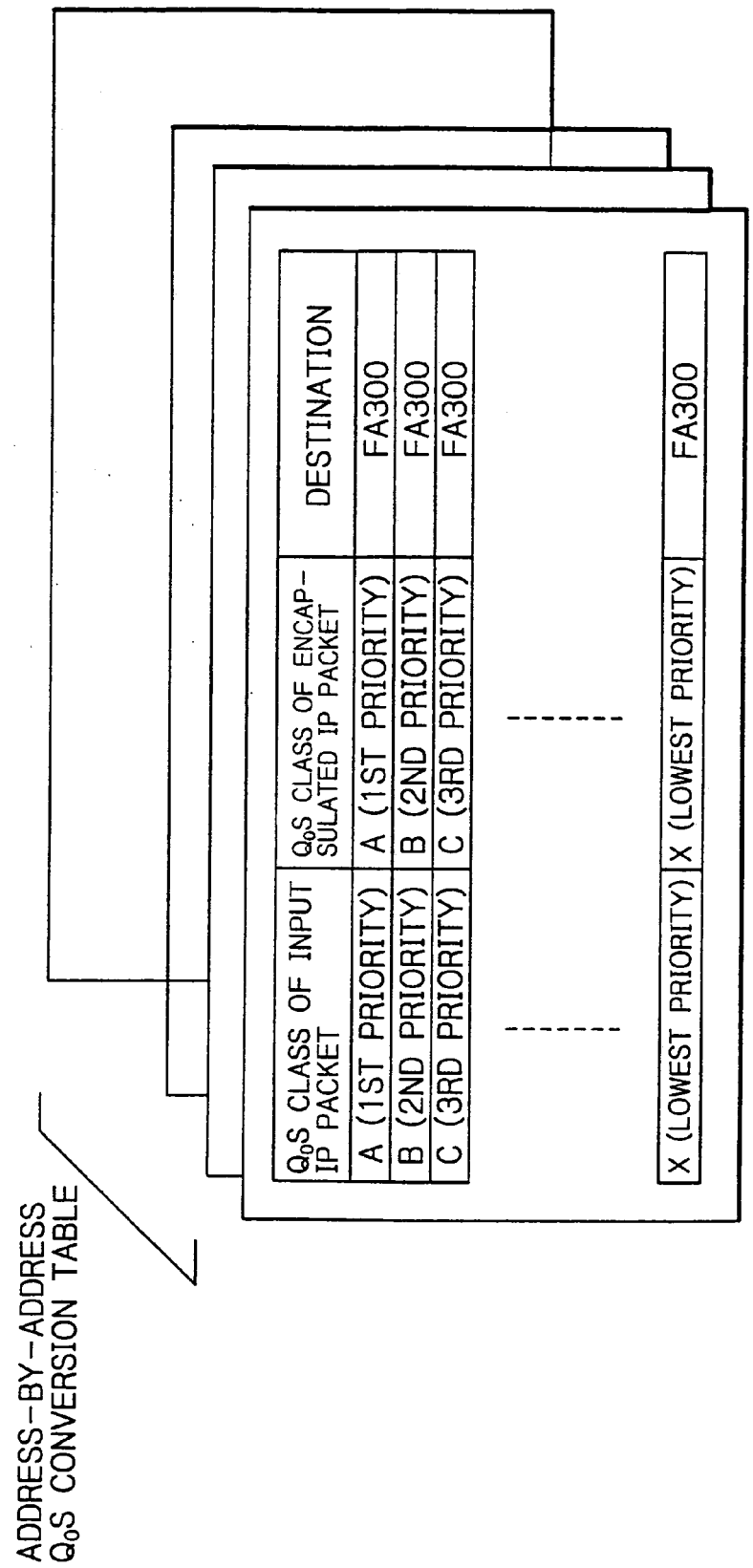
FIG. 4 shows a specific configuration of a binding table stored in a home agent included in the illustrative embodiment.

FIG. 4 shows a specific configuration of the binding table 210. As shown, the binding table 210 has a plurality of pages each being assigned to the home address of a particular mobile terminal. Each page of the binding table 210 lists QoS to be assigned to encapsulated packets and a Care-of address on the basis of the QoS class of a received IP packet. It is to be noted that the Care-of address may differ from one QoS class to another QoS class or two or more Care-of addresses may be registered at each QoS class.

The HA 200 encapsulates a received IP packet meant for the mobile terminal 110 in accordance with the information listed on the binding table 210. The HA 200 then transfers the encapsulated IP packet to the FA to which the mobile terminal 110 is currently connected. For encapsulation, the HA 200 may use any one of the schemes recommended in IETF RFC 2003, IETF RFC 2004 and IETF RFC 1701 mentioned earlier.

On receiving the encapsulated packet, the FA 300 or 310 separates the IP packet meant for the mobile terminal 110 from the encapsulated IF packet and sends the IP packet to the mobile terminal 110.

The operation of the illustrative embodiment will be described hereinafter. First, how IP packets flow on the mobile network will be described with reference to FIG. 3. As shown, when the fixed terminal 100 sends an IP packet A meant for the mobile terminal 110, the HA receives the IP packet A via the IP network 400. The HA 200 finds the page of the binding table 210 assigned to the mobile terminal 110 by using a destination address included in the IP packet A as a key. The destination address is identical with the home address assigned to the mobile terminal 110.

Subsequently, the HA 200 determines a QoS class to be assigned to an encapsulated packet and a care-of address by using ToS (Type of Service) information also included in the IP packet A as QoS class information. For example, assume that the QoS class of the IP packet A is A as listed on the binding table 210, FIG. 4. Then, the HA 200 determines that the QoS class of an encapsulated packet is A, and that the destination is the FA 300. Likewise, if the QoS class of the IP packet A is B, then the HA determines that the QoS class of an encapsulated packet is A, and that the destination is FA 300.

After the above-described processing, the HA 200 encapsulates the IP packet A to thereby produce an encapsulated IP packet A' and then sends the IP packet A' to the IP network 400. The IP packet A' is transferred to the FA 300 via the IP network 400. At this instant, each IP node on the IP network 400 transfers the IP packet A' toward the FA 300 while giving priority to the packet A' in accordance with the QoS class of the packet A'. The FA 300 separates the IP packet A meant for the mobile terminal 110 from the IP packet A' and sends the packet A to the mobile terminal 100.

As stated above, priority is given to one or more encapsulated IP packets A, being transferred from the HA 200 to the FA 300 via the IP network 400 in accordance with the QoS class of the packet A'.

A procedure for the mobile terminal 110 to register its location at the HA 200 will be described hereinafter. Assume that the mobile terminal 110 is moved away from the home network 410 and connected to the foreign network 420. Then, the FA 300 managing the foreign network 420 sends its Care-of address to the mobile terminal 110 in accordance with the IP protocol recommended in IETF RFC 2002. The mobile terminal 110 sends the Care-of address to the HA 200. The HA 200 registers the received Care-of address at the page of the binding table 210 assigned to the mobile terminal 110. This processing is defined as Registration in IETF RFC 2002.

Assume that the mobile terminal 110 in travel is handed over from the FA 300 to the FA 310. Then, the FA 310 sends its Care-of address to the mobile terminal 110. The mobile terminal 110 again sends the new Care-of address to the HA 200. The HA 200 registers the new Care-of address at the binding table 210. The information registered at the binding table 210 is valid only for a preselected term. The mobile terminal 110 therefore causes the HA 200 to update the information recorded in the binding table 210 at preselected intervals without regard to the hand-over of the mobile terminal 110. This procedure is generally referred to as binding update processing.

In the illustrative embodiment, the mobile network 110 sends to the HA 200 QoS information for setting the QoS classes of encapsulated IP packets by using a control packet available for registration or binding update processing. The HA 200 sets the contents of the binding table 210 in accordance with the QoS information received from the mobile terminal 110. The QoS information may advantageously be implemented by ToS information particular to a Diff-serv (Differentiated Services) protocol.

Figure 5:
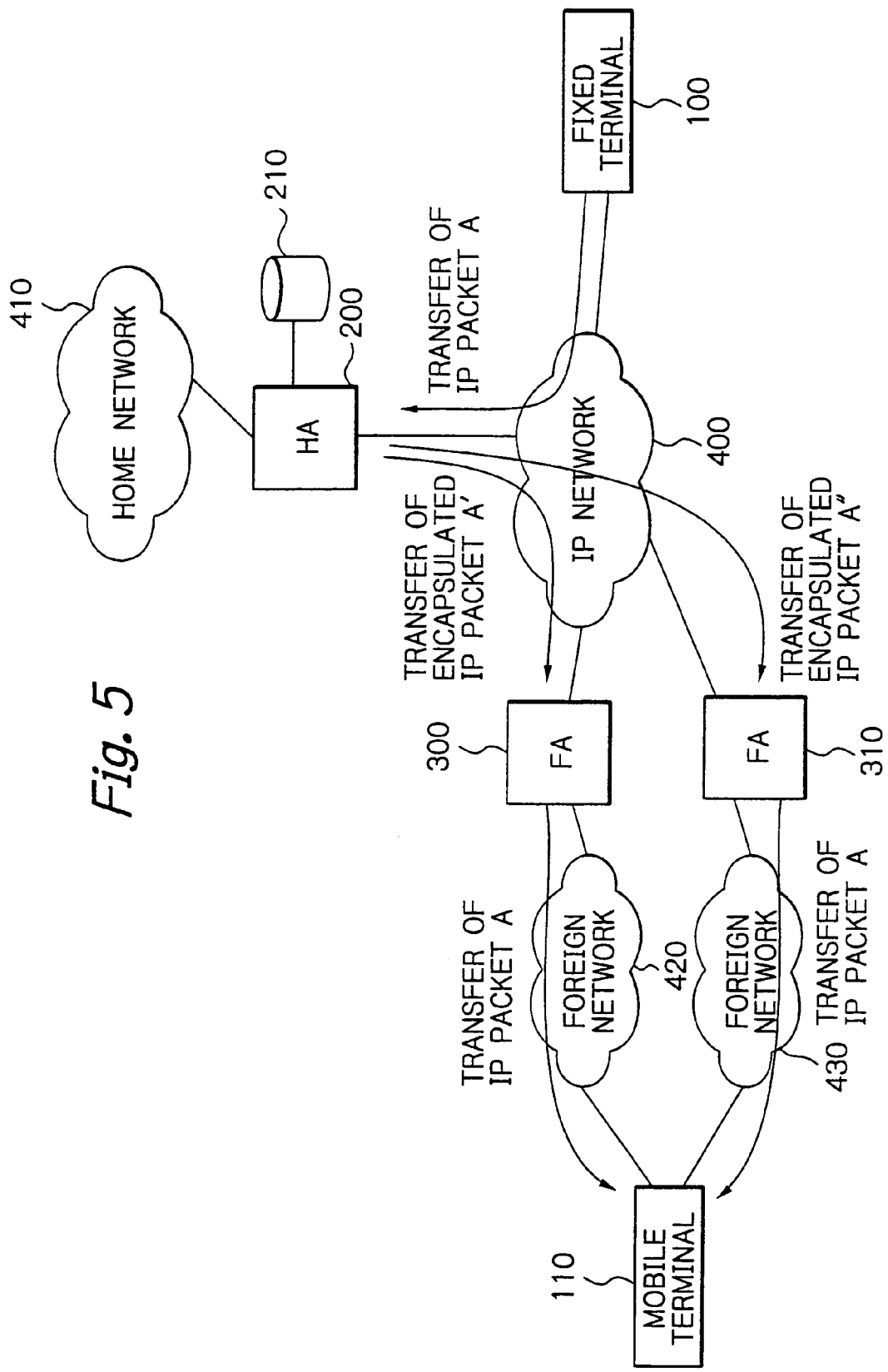
FIG. 5 is a schematic block diagram showing a modification of the illustrative embodiment.

As shown in FIG. 5, assume that the foreign networks 420 and 430 are mobile communication networks, and that the mobile terminal 110 is in a soft hand-over state. Then, the mobile terminal 110 accesses both of the FAs 300 and 310 at the same time. Consequently, the mobile terminal 110 causes the HA 200 to register both of the FAs 300 and 310 at the binding table 210 as the destinations of IP packets.

Figure 6:
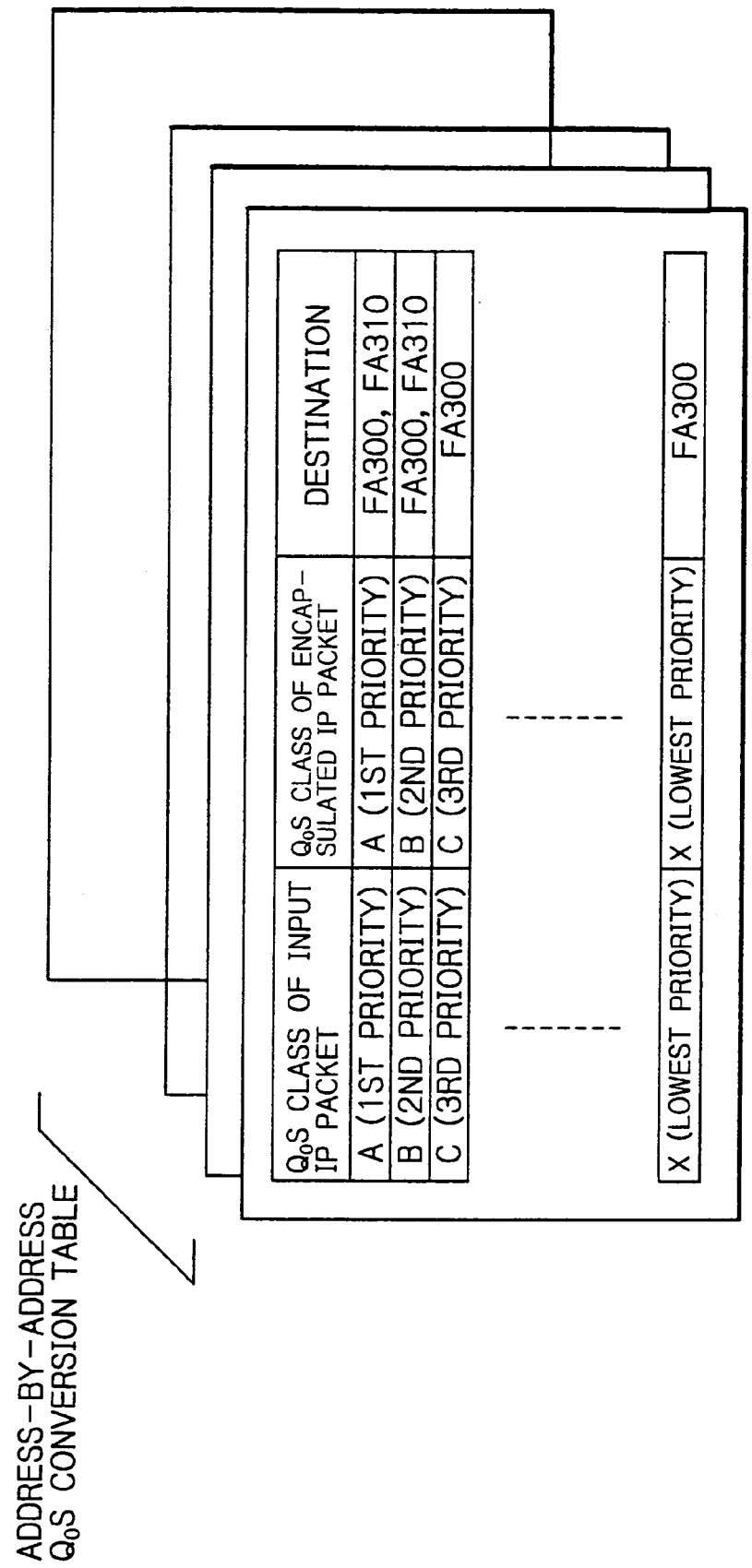
FIG. 6 shows a specific configuration of a binding table stored in a home agent included in the modification.

As stated above, the HA 200 can update the destination registered at the binding table 210 on a QoS class basis. For example, as shown in FIG. 6, the HA 200 can update the contents of the binding table 210 in such a manner as to transfer encapsulated packets belonging to some QoS classes to both of the FAs 300 and 310 while transferring encapsulated packets belonging to the other QoS class only to the FA 300.

Assume that the foreign networks 420 and 430 are a LAN and a mobile communication network, respectively. Then, the mobile terminal 110 can also cause the HA 200 to register different FAs at the binding table 210 on a QoS class basis. Further, when the mobile station 110 is connected to three or more foreign networks, it can register three or more destinations at the binding table 210.

When a plurality of destinations are registered at the binding table 210, the HA 200 generates identical encapsulated packets corresponding in number to the destinations and transfers them to the destinations. In the specific packet flow shown in FIG. 3, the HA 200 encapsulates the IP packet A into two identical packets A, and A" and transfers each of them to particular one of the FAs 300 and 310 via a particular path.

The QoS classes registered at the binding table 210 may be of a band guarantee type, a delay priority type, a best effort type or a resend control type. When the HA 200 updates the contents of the binding table 200, i.e., registers a new FA at the table 200 in accordance with a control packet received from the mobile station, the HA 200 sets up a new path to the FA on a QoS class basis.

As stated above, the mobile station 110 holds data communication while designating an FA or FAs on a QoS class basis with a control packet, which is used for registration or binding update processing. The HA 200 produces encapsulated packets on a QoS class basis in accordance with information listed on the binding table 210 and thereby implements end-to-end data communication with guaranteed QoS even when the mobile terminal 110 is connected to a foreign network.

Further, the HA 200 can register a plurality of FAs at the binding table 210 as destinations and can therefore transfer identical IP packets to all of such FAs at the same time. It follows that the mobile station 110 can surely receive IP packets even in a soft hand-over state. Moreover, even when different communication qualities are required and when foreign networks satisfying the communication qualities are different from each other, FAs on the different networks can be registered at the binding table 210 as destinations on a QoS class basis. This successfully implements data communication with guaranteed QoS.

Reference will be made to FIG. 7 for describing an alternative embodiment of the present invention. While the embodiment described above uses the Mobile IPv4 protocol, the alternative embodiment to be described uses a Mobile IPv6 protocol. In accordance with the Mobile IPv6 protocol, IP addresses called Collocated Care-of addresses are used as the Care-of addresses each being assigned to a particular mobile terminal. Specifically, a particular Collocated Care-of address is assigned to each mobile terminal on a foreign network basis. The Collocated Care-of addresses are registered at the storage of an HA together with home addresses and managed as a binding table, as in the previous embodiment. The Mobile IPv6 protocol can unconditionally identify each terminal with the Collocated Care-of address and therefore makes FAs needless.

Further, the Mobile IPv6 protocol allows even a fixed terminal and a node terminating with the IPv6 protocol to have respective binding tables. In this case, the fixed terminal or the node terminating with the Mobile IPv6 protocol can directly communicate with each other without the intermediary of an HA except for a period necessary for the fixed terminal or the node to generate a binding table after the start of communication.

As shown in FIG. 7, the alternative embodiment differs from the previous embodiment in that it does not include FAs. In the illustrative embodiment, the fixed terminal 101 also includes its own binding table 221. Further, a home network 411, foreign networks 421 and 431 and IP nodes all are implemented by equipment adaptive to the IPv6 protocol.

The binding table 211 of the fixed terminal 101 and a binding table 211 stored in an HA 201 each are identical in format with the binding table 210 of the previous embodiment except that Collocated Care-of addresses are listed as destinations in place of FAs. A plurality of Collocated Care-of addresses may also be registered together on a QoS class basis.

In operation, a mobile terminal executes registration at the HA 201 when moved away from the home network 411 and connected to the foreign network 421. When the mobile terminal 111 is handed over from the foreign network 421 to the foreign network 431, it executes binding update processing. In addition, the mobile terminal 111 registers QoS information at the HA 201 by using a control packet for registration or binding update processing, as in the previous embodiment.

When the fixed terminal 101 sends an IP packet A meant for the mobile terminal 111, the packet A is transferred to the HA 201 via an IP network 401. The HA 201 searches the binding table 211 to find the Collocated Care-of address of the mobile terminal 111 on the basis of a destination address included in the IP packet. The HA 201 then updates the destination address of the IP packet A in accordance with the Collocated Care-of address and generates an IP packet B. At the same time, the HA 201 sets up a path to the mobile terminal 111 on a QoS class basis. The IP packet B is transferred from the HA 201 to the mobile terminal 111 via the above path.

When the mobile terminal 111 communicates with the fixed terminal 101, the former 111 executes binding update processing meant for the latter 101. More specifically, the binding list of the mobile terminal 111 is registered at the binding table 221 included in the fixed terminal 101. After registering the binding list and QoS information of the mobile terminal 111, the fixed terminal 101 sends an IP packet to the mobile terminal 111 by using the Collocation Care-of address registered at the binding table 221. More specifically, as shown in FIG. 7, an IP packet C is directly sent from the fixed terminal 101 to the mobile terminal 111. The QoS class of the IP packet C is based on a QoS class registered at the binding table 221.

A plurality of Collocated Care-of addresses can be registered at the binding table 221 as destinations, as in the previous embodiment. In such a case, the HA 201 or the fixed terminal 101 sets up paths to the mobile terminal 111 on a QoS class basis, copies the IP packet C by a number corresponding to the destinations, and sends the resulting packets C via the paths. With this configuration, the illustrative embodiment, like the previous embodiment, allows the mobile terminal 111 to surely receive IP packets even in a soft hand-over state and therefore realizes end-to-end data communication with guaranteed QoS.

In summary, in accordance with the present invention, a mobile terminal handed over from one network to another network reports its destination and QoS information to an IP node to which the mobile terminal is usually connected. The IP node transfers encapsulated IP packets or IP packets with an updated IP address to the destination of the mobile network via a path matching with a QoS class. The present invention therefore realizes a mobile network implementing end-to-end communication with guaranteed QoS.

Further, the present invention allows a plurality of IP nodes to be registered as the destinations of IP packets. The mobile terminal can therefore surely receive the IP packets even in a soft hand-over state. Moreover, even when communication quality differs from one QoS class to another QoS class and when foreign networks satisfying the different qualities differ from each other, the present invention insures communication with guaranteed QoS by setting IP nodes on the foreign networks as destinations on a QoS class basis.

Various modifications will become possible for those skilled in the art after receiving the teachings of the present disclosure without departing from the scope thereof.

What is claimed is:

1. A mobile network for communication between a plurality of terminals, comprising:
    a first IP (Internet Protocol) node for generating, on receiving an IP packet meant for a mobile terminal usually connected to said first IP node, but handed over, an encapsulated IP packet for transferring said IP packet to a destination of said mobile terminal, and transferring said encapsulated IP packet to said destination via a path matching with a QoS (Quality of Service) class of said encapsulated IP packet; and
    a second IP node for separating, when the mobile terminal is connected to said second IP node at the destination, said IP packet from said encapsulated IP packet received from said first IP node and sending said IP packet to said mobile terminal;
    wherein the mobile terminal handed over reports the destination to said first IP node together with OoS information for setting the QoS class of the encapsulated IP packet.

2. The network as claimed in claim 1, wherein when a plurality of destinations of the IP packet exist, said first IP node generates the encapsulated IP packets corresponding in number to said plurality of destinations and sends said encapsulated IP packets to each of said plurality of destinations.

3. The network as claimed in claim 1, wherein said first IP node stores destination information and the QoS information, by each input IP packet, in a form of a table.

4. The network as claimed in claim 3, wherein when a plurality of destinations of the IP packet exist, said first IP node generates the encapsulated IP packets corresponding in number to said plurality of destinations and sends said encapsulated IP packets to said plurality of destinations.

5. The network as claimed in claim 3, wherein said first IP node sets a preselected valid term on the destination information and the QoS information and updates said destination information and said QoS information when the mobile terminal is handed over and at preselected intervals.

6. The network as claimed in claim 5, wherein when a plurality of destinations of the IP packet exist, said first IP node generates the encapsulated IP packets corresponding in number to said plurality of destinations and sends said encapsulated IP packets to said plurality of destinations.

7. The network as claimed in claim 1, wherein the mobile terminal reports the destination and the QoS information to said first IP noted by using a control packet for registration.

8. The network as claimed in claim 7, wherein when a plurality of destinations of the IP packet exist, said first IP node generates the encapsulated IP packets corresponding in number to said plurality of destinations and sends said encapsulated IP packets to each of said plurality of destinations.

9. A mobile network for communication between a plurality of terminals, comprising:
    an IP node to which a first terminal is usually connected generates, on receiving a first IP packet meant for said first terminal handed over, a second IP packet having an IP address of a destination of said first terminal substituted for an IP address of said first IP packet and sends said second IP packet to said destination via a path matching with a QoS class of said second IP packet, and
    wherein the first terminal reports the destination to at least one of said IP node and a second terminal that sent the first IP packet together with QoS information for setting a QoS class of the second IP packet.

10. The network as claimed in claim 9, wherein when a plurality of destinations of the first IP packet exist, said IP node generates the second IP packets corresponding in number to said plurality of destinations and sends said second IP packets to each of said plurality of destinations.

11. The network as claimed in claim 9 wherein the first terminal reports the destination and the QoS information to said IP node and the second terminal by using a control packet for registration.

12. The network as claimed in claim 11, wherein when a plurality of destinations of the first IP packet exist, said IP node generates the second IP packet corresponding in number to said plurality of destinations and sends said second IP packets to each of said plurality of destinations.

13. The network as claimed in claim 9, wherein said IP node and the second terminal each store the destination information and the QoS information in a form of a table.

14. The network as claimed in claim 13, wherein when a plurality of destinations of the first IP packet exist, said IP node generates the second IP packet corresponding in number to said plurality of destinations and sends said second IP packets to each of said plurality of destinations.

15. The network as claimed in claim 13, wherein said IP node and the second terminal each set a preselected valid term on the destination information and the QoS information and update said destination information and said QoS information when the first terminal is handed over and at preselected intervals.

16. The network as claimed in claim 15, wherein when a plurality of destinations of the first IP packet exist, said IP node generates the second IP packets corresponding in number to said plurality of destinations and sends said second IP packets to said plurality of destinations.

17. The network as claimed in claim 9, wherein on receiving the destination information and the QoS information from the first terminal, the second terminal generates the second IP packet and sends said second IP packet to said first terminal.

18. The network as claimed in claim 17, wherein when a plurality of paths exist, the second terminal copies the second IP packets by a number corresponding to a number of said plurality of paths and sends copied IP packets to the first terminal via said plurality of paths.

19. An IP packet transferring method for allowing a plurality of terminals to communicate with each other via a mobile network, said IP packet transferring method comprising the steps of:
causing a first IP node to which a mobile terminal is usually connected to generate, on receiving an IP packet meant for said mobile terminal handed over, an encapsulated IP packet for transferring said IP packet to a destination of said terminal;
causing the first IP node to transfer the encapsulated IP packet to the destination via a path matching with a QoS class of said encapsulated IP packet; and
causing a second IP node to which the mobile terminal is connected at the destination to separate the IP packet from the encapsulated IP packet received from the first IP node and sending said IP packet to said mobile terminal;
wherein the mobile terminal handed over reports the destination to the first IP node together with QoS information for setting the QoS class of the encapsulated IP packet.

20. The method as claimed in claim 19, wherein when a plurality of destinations of the IP packet exist, the first IP node generates the encapsulated IP packets corresponding in number to said plurality of destinations and sends said encapsulated IP packets to each of said plurality of destinations.

21. The method as claimed in claim 19, wherein the mobile terminal reports the destination and the QoS information to the first IP node by using a control packet for registration.

22. The method as claimed in claim 21, wherein when a plurality of destinations of the IP packets exist, the first IP node generates the encapsulated IP packets corresponding in number to said plurality of destinations and sends said encapsulated IP packets to each of said plurality of destinations.

23. The method as claimed in claim 19, wherein the first IP node stores destination information and the QoS information in a form of a table.

24. The method as claimed in claim 23: wherein when a plurality of destinations of the IP packet exist, said first IP node generates the encapsulated IP packets corresponding in number to said plurality of destinations and sends said encapsulated IP packets to each of said plurality of destinations.

25. The method as claimed in claim 23, wherein a preselected valid term is set on the destination information and the QoS information, and said destination information and said QoS information are updated when the mobile terminal is handed over and at preselected intervals.

26. The method as claimed in claim 25, wherein when a plurality of destinations of the IP packet exist, said first IP node generates the encapsulated IP packets corresponding in number to said plurality of destinations and sends said encapsulated IP packets to each of said plurality of destinations.

27. An IP packet transferring method for allowing a plurality of terminals to communicate with each other via a mobile network, said IP packet transferring method comprising the steps of:
causing an IP node to which a first terminal is usually connected to generate, on receiving a first IP packet meant for said first terminal handed over, a second IP packet having an IP address of a destination of said first terminal substituted for an IP address of said first IP packet;
causing the IP node to send the second IP packet to the destination via a path matching with a QoS class of said second IP packet; and
causing the first terminal to report the destination to at least one of said IP node and a second terminal that sent the first IP packet together with QoS information for setting a QoS class of the second IP packet.

28. The method as claimed in claim 27, wherein the first terminal reports the destination and the QoS information to the IP node and the second terminal by using a control packet for registration.

29. The method as claimed in claim 27, wherein the IP node and the second terminal each store destination information and the QoS information in a form of a table.

30. The method as claimed in claim 27, wherein a preselected valid term is set on the destination information and the QoS information, and said destination information and said QoS information are updated when the first terminal is handed over and at preselected intervals.

31. The method as claimed in claim 27, wherein when a plurality of destinations of the first IP packet exist, said IP node generates the second IP packets corresponding in number to said plurality of destinations and sends said second IP packets to said plurality of destinations.

32. The method as claimed in claim 27, wherein when the first terminal is handed over, the IP node generates the second IP packet having an IP address of the destination substituted for an IP address assigned to said first terminal and sends said second IP packet to said first terminal.

33. The method as claimed in claim 32, wherein when a plurality of paths exist, the second terminal copies the second IP packet by a number corresponding to a number of said plurality of paths and sends copied IP packets to the first terminal via said plurality of paths.

34. A location registration server connected to a mobile network for transferring IP packets to thereby allow a plurality of terminals, which include a mobile terminal usually connected to said location registration server, to communicate with each other, said location registration server comprising:
 a processing device for encapsulating, on receiving an IP packet meant for the mobile terminal handed over, said IP packet to thereby produce an encapsulated IP packet and transferring said encapsulated IP packet to a destination of said mobile terminal via a path particular to a QoS class to which said encapsulated IP packet belongs; and
 a storage for storing destination information and QoS information, which is used to set the QoS class of the encapsulated IP packet, received from the mobile terminal handed over.

35. The server as claimed in claim 34, wherein when a plurality of destinations to which the IP packet should be transferred exist, said processing device produces the encapsulated IP packets corresponding in number to said plurality of destinations and then sends said encapsulated IP packets to each of said plurality of destinations.

36. The server as claimed in claim 34, wherein said storage stores the destination information and the QoS information in a form of a table.

37. The server as claimed in claim 36, wherein when a plurality of destinations to which the IP packet should be transferred exist, said processing device produces the encapsulated IP packets corresponding in number to said plurality of destinations and then sends said encapsulated IP packets to each of said plurality of destinations.

38. The server as claimed in claim 36, wherein a preselected valid term is set on the destination information and the QoS information, and said destination information and said QoS information are updated when the mobile terminal is handed over and at preselected intervals.

39. The server as claimed in claim 38, wherein when a plurality of destinations to which the IP packet should be transferred exist, said processing device produces the encapsulated IP packets corresponding in number to said plurality of destinations and then sends said encapsulated IP packets to each of said plurality of destinations.

40. A location registration server connected to a mobile network for transferring IP packets to thereby allow a plurality of terminals, which include a mobile terminal usually connected to said location registration server, to communicate with each other, said location registration server comprising:
 a processing device for generating, on receiving a first IP packet meant for the mobile terminal handed over, a second IP packet having an IP address of a destination of said mobile terminal substituted for an IP address of said first IP packet and sending said second IP packet to said destination via a path particular to a QoS class of said second IP packet; and
 a storage for storing destination information and QoS information, which is used to set a QoS class to which the second IP packet belongs, received from the mobile terminal.

41. The server as claimed in claim 40, wherein when a plurality of destinations to which the IP packet should be transferred exist, said processing device produces the encapsulated IP packets corresponding in number to said plurality of destinations and then sends said encapsulated IP packets to each of said plurality of destinations.

42. The server as claimed in claim 40, wherein said storage stores the destination information and the QoS information in a form of a table.

43. The server as claimed in claim 42, wherein when a plurality of destinations to which the IP packet should be transferred exist, said processing device produces the encapsulated IP packets corresponding in number to said plurality of destinations and then sends said encapsulated IP packets to each of said plurality of destinations.

44. The server as claimed in claim 42, wherein a preselected valid term is set on the destination information and the QoS information, and said destination information and said QoS information are updated when the mobile terminal is handed over and at preselected intervals.

45. The server as claimed in claim 44, wherein when a plurality of destinations to which the IP packet should be transferred exist, said processing device produces the encapsulated IP packets corresponding in number to said plurality of destinations and then sends said encapsulated IP packets to each of said plurality of destinations.

46. A fixed terminal connected to a mobile network for interchanging IP packets with a mobile terminal, said fixed terminal comprising:
 a processing device for replacing, when the mobile terminal is handed over, an IP address assigned to a first IP packet sent to said mobile terminal with an IP address indicative of a destination of said mobile terminal, and sending said second IP packet to said destination via a path particular to a QoS class of said second IP packet; and
 a storage for storing destination information and QoS information, which is used to set a QoS class to which the second IP packet belongs, received from the mobile terminal.

47. The terminal as claimed in claim 46, wherein when a plurality of paths exist, said processing device produces the encapsulated IP packets corresponding in number to said plurality of paths and then sends said encapsulated IP packets via said plurality of paths.

48. The terminal as claimed in claim 46, wherein said storage stores the destination information and the QoS information in a form of a table.

49. The terminal as claimed in claim 48, wherein when a plurality of paths exist, said processing device produces the encapsulated IP packets corresponding in number to said plurality of paths and then sends said encapsulated IP packets via said plurality of paths.

50. The terminal as claimed in claim 46, wherein a preselected valid term is set on the destination information and the QoS information, and said destination information and said QoS information are updated when the mobile terminal is handed over and at preselected intervals.

51. The terminal as claimed in claim 50, wherein when a plurality of paths exist, said processing device produces the encapsulated IP packets corresponding in number to said plurality of paths and then sends said encapsulated IP packets via said plurality of paths.

* * * * *